P. E. Garrin,
Steam-Boiler Cleaner.
N° 49,255.    Patented Aug. 8, 1865.

Witnesses.
Francis D Pastorius.
Amos J. Kelly

Inventor.
P. Eldredge Garrin

UNITED STATES PATENT OFFICE.

P. ELDREDGE GARVIN, OF PHILADELPHIA, PENNSYLVANIA.

IMPROVED MACHINE FOR REMOVING SCALE FROM STEAM-BOILER FLUES.

Specification forming part of Letters Patent No. 49,255, dated August 8, 1865; antedated March 30, 1865.

*To all whom it may concern:*

Be it known that I, P. ELDREDGE GARVIN, of Philadelphia, in the county of Philadelphia, in the State of Pennsylvania, have invented a new and Improved Machine for Scaling the Tubes of Steam-Boilers; and I do hereby declare that the following is a full, clear, and exact description thereof, reference being had to the accompanying drawings, and to the letters of reference marked thereon.

My invention relates to removing the scale deposited on the inside of the tubes of steam-boilers by means of a cutter revolving on a screw, which screw passes the entire length of the tube and is secured at its bottom by such suitable device as is hereinafter described.

In order to enable skilled mechanics to make and use my invention, I will proceed to describe its construction and operation.

Figure 1:
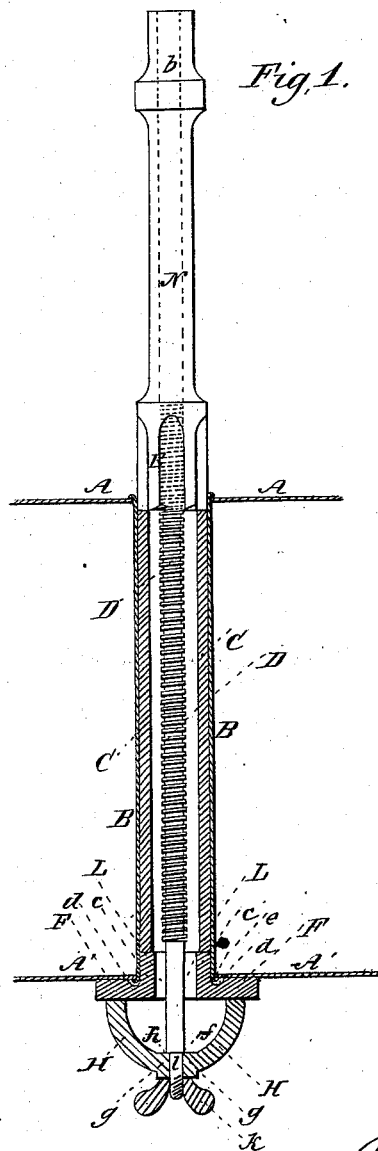
Figure 2:
Figure 4:
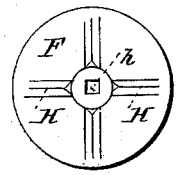
Figure 3:
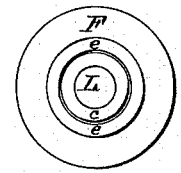

On reference to the accompanying drawings, which form a part of this specification, Figure 1 is a sectional view. Fig. 2 is a bottom view of the cutter. Fig. 3 is a view of the base-plate, showing the groove and conical projection. Fig. 4 is a view of the base-plate, showing the dog H.

Similar letters refer to similar parts throughout the several views.

A A' represent the top and bottom tube-sheets of a steam-boiler.

B is a tube with an inside coating of scale, C.

D is a feed-screw, which passes the whole length of the tube B, and has the cutter E screwed onto its upper end, and is kept in place at the lower end of the tube B by the base-plate F, the dog H, and the thumb screw K. The cutter E is screwed on the socket N, which socket has the shank *b* screwed onto its upper end. A hole for the reception of the screw D is drilled the whole length of the cutter, socket, and shank. A screw is cut in the cutter E for screwing the cutter onto the screw D. The shank *b* is made of any convenient shape for working with a ratch-wrench or any similar device. When the scale is cut out about one-half the length of the tube another socket is attached to the shank *b*, of sufficient length to carry the cutter to the bottom of the tube.

The base-plate F has the conical-shaped collar *c* projecting from its inner face. This collar *c* enters and expands the tube B and keeps it water-tight while the tube is being scaled. The groove *d* is cut in the inner face of the base-plate F, and is for receiving the lap *e* of the tube B. The circular hole L in the base-plate is made sufficiently large to allow the scale-cuttings to drop out between the screw D and the edge of the hole L. The shoulder *f* of the screw-spindle bears against the inner side of the boss *g* of the dog H, and when the thumb-screw K is firmly screwed down a firm and secure connection is made between the screw D and the dog H. The opening *h* in the boss *g* is made square, and the end *l* of the screw-spindle is made to suit to keep the screw D from turning.

In proceeding to use my tube-scaler I first screw the cutter E onto the screw D, then passing the screw D down the tube B until the edges of the cutter E bear against the scale C. I then arrange the base-plate F, the dog H, and the thumb-screw K as shown in Fig. 1. The cutter E is worked by a ratchet-wrench or its equivalent applied at the shank *b*, which ratchet-wrench gives it a circular-cutting motion, while the screw D imparts the necessary feed motion by keeping the cutter E screwed down or fed into the scale.

What I claim as my invention, and desire to secure by Letters Patent, is—

The arrangement of the screw D, the cutter E, the base-plate F, with the conical-shaped collar *c*, and the groove *d*, the dog H, and the thumb-screw K, constructed and operated for the purpose and in the manner as herein described.

P. ELDREDGE GARVIN.

Witnesses:
AMOS J. KELLY,
JAMES McCALEM.